No. 766,562. PATENTED AUG. 2, 1904.
J. E. WERTZ.
COMBINATION RULE.
APPLICATION FILED APR. 13, 1904.
NO MODEL.

Witnesses:
K. H. Butler
E. E. Potter

Inventor
J. E. Wertz,
By N. C. Everts
Attorneys

No. 766,562.

Patented August 2, 1904.

UNITED STATES PATENT OFFICE.

JOSEPH E. WERTZ, OF DICKERSON RUN, PENNSYLVANIA.

COMBINATION-RULE.

SPECIFICATION forming part of Letters Patent No. 766,562, dated August 2, 1904.

Application filed April 13, 1904. Serial No. 202,939. (No model.)

*To all whom it may concern:*

Be it known that I, JOSEPH E. WERTZ, a citizen of the United States of America, residing at Dickerson Run, in the county of Fayette and State of Pennsylvania, have invented certain new and useful Improvements in Combination-Rules, of which the following is a specification, reference being had therein to the accompanying drawings.

This invention has relation to instruments of precision, and has for its object to produce a novel instrument combining in one the functions of a measure or rule, a compass, and a square.

The measure or rule to which I propose to apply my improvements is a rule made in jointed sections, commonly known as a "foot-rule;" but my invention is applicable to any instrument of a like character, and in carrying my invention into effect, using the term "rule" to indicate a jointed measuring instrument of any description, I provide the rule with a slotted arc-shaped segment which is pivotally attached to one of the sections of the rule, and I provide another section of the rule with a thumb-nut, so located that in one position of the parts it will engage with the arc-shaped segment and maintain the sections of the rule in any angle to which they may be adjusted. In addition to the before-mentioned arc-shaped segment and thumb-nut I provide a novel form of joint comprising a spring-pressed hinge which will sustain the sections of the rule at the middle joint thereof in a position either at right angles or parallel to one another, and I further provide means for locking the hinges at the intermediate joints of the rule when the latter is being used as a compass or dividers, and I shape two ends of the rule to pointed form to facilitate the employment of the rule as a compass or dividers.

My invention consists in the novel construction, combination, and arrangement of parts to be hereinafter more fully described and claimed.

Figure 1:
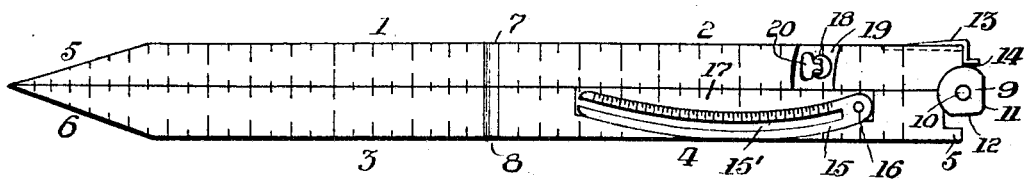
Figure 2:
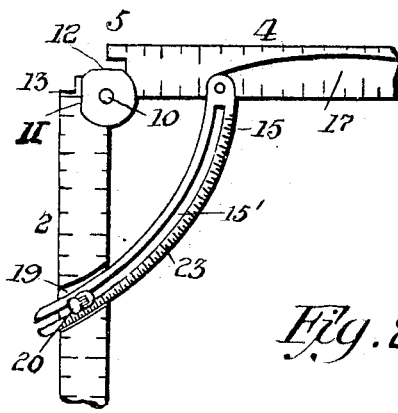
Figure 3:
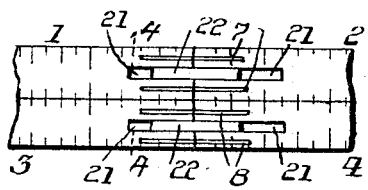
Figure 4:
Figure 5:
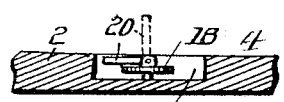
Figure 6:
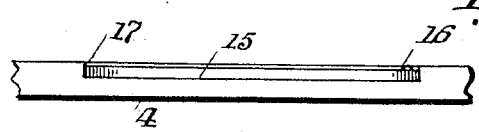
Figure 7:
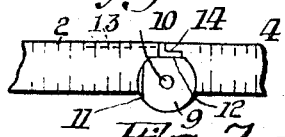

In the accompanying drawings, Figure 1 is a plan view of a rule formed of four jointed sections and embodying my improvements. Fig. 2 is a fragmentary plan view of the middle portion of the rule, illustrating the position of the parts when the rule is arranged to be used as a square. Fig. 3 is a plan view showing the means for locking the intermediate joints. Fig. 4 is a transverse sectional view on the line 4 4 of Fig. 3. Fig. 5 is a longitudinal sectional view of a part of the rule illustrated in Fig. 1, showing the means for securing the arc-shaped segmental attachment in fixed position. Fig. 6 is a side elevation of the arc-shaped segmental attachment and that part of the rule upon which the same is pivoted; and Fig. 7 is a fragmentary plan view of the middle portion of the rule, showing the hinge at that part in position which it occupies when the sections of the rule are extended in alinement with one another.

The rule is composed of four sections 1 2 3 4, the sections 1 and 3, which when the rule is extended constitute the end sections, being beveled on their outer edges, as shown at 5 6, to form points. The sections 1 2 are jointed together by a hinge 7, and the sections 3 4 are jointed together by a similar hinge 8, while the sections 2 and 4 are jointed together by a hinge 9. The hinge 9 is constructed somewhat after the manner of the hinges usually employed at the middle joint of the rule—that is to say, it is composed of overlapping segmental plates, which are pivotally connected by a pintle or rivet 10, the one plate being secured to the section 2 and the other plate being secured to the section 4. In my improved construction these plates are formed with flat sides 11 12, and in the section 2 a bent spring 13 is arranged, the said spring being bent twice at right angles on its ends, so as to provide a flat tongue 14, which engages with the flat side 12 of the hinge when the arms of the latter are arranged at right angles to one another, as shown in Fig. 2. The section 4 is formed with a lug 5 on its end, which when the rule is extended so that the sections 2 and 4 are in alinement with one another overlaps the tongue 14 of the spring 13, the said tongue in that position resting upon the flat side 12 of the hinge and the spring in this position serving to hold the rule extended, as shown, and preventing it from closing accidentally.

The arc-shaped plate 15 is pivotally attached at 16 to the section 4 and when the rule is closed rests in a recess 17, the said arc-shaped plate being provided with an arc-shaped open slot 15'. A thumb-nut 18 is located in a curved slot 19 in the section 2, the said thumb-nut being provided with a pivoted handle 20, which when the rule is not in use folds down, so as to lie flush with or below the surface of the upper side of section 2; but it can be turned up, as shown in dotted lines in Fig. 3, when it is desired to operate the nut. The hinges 7 8, by means of which the sections 1 2 and 3 4 are jointed together, are also of the ordinary and well-known construction; but in order to sustain the said sections in their open position I form in the sections 1 2 and 3 4 dovetail slots 21, and I fit in these slots slidable rabbets 22, which are somewhat shorter than the coinciding slots of the sections 1 2 and 3 4 and which serve when moved along in the slots to the position shown in Fig. 3 to maintain the hinged joints at these positions rigid.

The device shown and described herein is used as follows: The rule is marked off in feet and inches on its edges, as shown, and the arc-shaped plate 15 is marked in degrees on one edge, as indicated at 23. The rule can be used in the manner of any ordinary rule, the same being held in the extended position by spring 13, as shown in Fig. 7, and the joints 7 8 being, if desired, made rigid by sliding the rabbets 22 along in the slots 21 until they overlap the joints.

If it be desired to use the rule as a compass or dividers, the arc-shaped plate 15 is swung around and passed into the slot 19 of section 2 and the arms of the rule locked at any angle to one another at which they may be placed by turning down the thumb-nut 18 upon the arc-shaped plate 15, the divisions on the arc-shaped plate indicating the angle to which the arms of the rule now constituting a compass may be adjusted. When arranged in this manner, the hinges 7 are prevented from closing by sliding the rabbets 22 along in the slots 21 until they overlap the joint between the sections 1 2 and 3 4. If it be desired to use the instrument as a square, the sections 2 4 are turned on the middle hinge until they assume the position shown in Fig. 2—that is, at right angles to one another—this point of adjustment being easily secured by the spring 13, which when the said arms have arrived at or near a right angle pressing upon the flat surface 12 of the hinge 9 brings the arms to the desired position when they have been spread to approximately right angles one to the other, the thumb-nut and the arc-shaped segment being then utilized, as before described, to sustain the arms in this position.

Having fully described my invention, what I claim as new, and desire to secure by Letters Patent, is—

1. In a device of the character described, the combination of two flat rule-sections, a hinge connecting such sections, one of the sections being formed with an arc-shaped recess in one of the flat sides and the other of said sections being formed with a slot on one of its flat sides, an arc-shaped, graduated and slotted plate pivotally secured in that section having a recess and adapted to lie in said recess when in folded position and in the slot in the other section when in extended position, and a thumb-nut located in said slot with its head below the plane of the side of the rule-section, said nut being adapted to engage said slotted plate.

2. In a device of the character described, the combination in a rule composed of four sections, a hinge connecting the middle sections, said hinge having a flat side, a spring arranged on one of said middle sections and adapted to bear on said flat side, when the middle sections are at right angles to one another, an arc-shaped slotted plate arranged in a recess in and pivotally secured to one of said sections, a thumb-nut arranged in fixed position in a slot adapted to receive said plate on the other of said sections and adapted to engage said slotted plate, hinges connecting the middle sections with the end sections, and means for locking the last-named hinges when the several sections are in the extended position.

3. In a device of the character described, the combination of two hinged rule-sections, an arc-shaped slotted plate pivotally attached to one section and located in a recess in the side thereof, a thumb-nut having a pivotal handle, said thumb-nut being located in a slot in the other section and the pivoted handle of the nut, when folded down, lying below the plane of the surface of the section on which said nut is carried.

In testimony whereof I affix my signature in the presence of two witnesses.

JOSEPH E. WERTZ.

Witnesses:
H. C. EVERT,
K. H. BUTLER.